Feb. 25, 1958  G. G. BROWN  2,824,543
ULTRASONIC TINNING APPARATUS
Filed Jan. 14, 1955  2 Sheets-Sheet 1

INVENTOR.
GILBERT G. BROWN
BY
*Geo. G. Hyde*
ATTORNEY

Feb. 25, 1958 G. G. BROWN 2,824,543
ULTRASONIC TINNING APPARATUS
Filed Jan. 14, 1955 2 Sheets-Sheet 2

INVENTOR.
GILBERT G. BROWN
BY
Geo. G. Hyde
ATTORNEY

United States Patent Office 2,824,543
Patented Feb. 25, 1958

2,824,543

ULTRASONIC TINNING APPARATUS

Gilbert G. Brown, Davenport, Iowa, assignor to Bendix Aviation Corporation, Teterboro, N. J., a corporation of Delaware Application January 14, 1955, Serial No. 481,929

20 Claims. (Cl. 118—72)

This invention relates to soldering and is particularly directed to apparatus and a method for tinning metals with the aid of ultrasonic waves. It is particularly applicable to metals such as aluminum, magnesium and their alloys, which are especially difficult to tin.

It has been ascertained that ultrasonic waves are of material assistance in tinning such metals by breaking up the coating on the surface of the metal to be tinned, usually an oxide or dirt, permitting the molten solder to contact directly and wet or alloy with the metal. This is effectively accomplished by pressing the metal surface to be tinned against a surface of metal covered with molten solder through which ultrasonic waves are being transmitted. It is understood that the resulting tinning of the aluminum or other metal is due to the cavitation produced in the thin layer of molten solder between the two metal surfaces, resulting in implosion which breaks up the oxide and/or dirt coating, and possibly also to the action of ultrasonic waves transmitted to the metal to be tinned. In any event, this procedure is effective in tinning metals of the indicated type.

However, the procedure has been carried out by the use of soldering irons or the like in which the ultrasonically vibrated surface is of substantially limited extent, and carries only as much solder as will adhere to the surface. Moreover, the amount of ultrasonic wave energy that can be developed at the soldering iron tip is limited by the inherent restrictions due to the size of the iron.

A general object of the invention is to improve substantially the effectiveness of tinning metals of the type enumerated with the aid of ultrasonic waves. One object is to provide a tinning apparatus having a tinned ultrasonically vibrated surface of much greater extent than has heretofore been available. Another object is to provide a substantially greater ultrasonic wave energy to such a surface.

A further object is to provide an improved arrangement that will effectively tin relatively large areas. A related purpose is to provide an ultrasonically vibrated tinning surface against which the metal to be tinned can be conveniently pressed, but carrying a larger supply of solder than is possible by adherence to a soldering iron surface. A specific purpose is to provide a molten solder receptacle having a relatively larger ultrasonically vibrated flat bottom adapted to transmit ultrasonic waves to large immersed metal areas bearing against the bottom.

Another object is to provide an ultrasonic tinning apparatus of a novel type that is compact and efficient. A purpose is to include in such apparatus an effective cooling arrangement. A related object is to provide tinning apparatus having an efficient tinning head carrying sources of heat and ultrasonic waves associated with a shallow top container for molten solder.

A further object is to provide a magnetostrictive transducer unit adapted to have its lower portion immersed in cooling liquid, with means for preventing such liquid from creeping up the unit, and specifically from creeping up to a heated zone adjacent to the top of the unit.

It has been found advantageous in some instances to provide a substantial depth of molten solder on an ultrasonically vibrated surface against which the metal object to be tinned may be pressed; and an object of the invention is to provide an arrangement of this type. A related purpose is to tin a metal surface by the combined action of ultrasonic waves in a tinned surface against which a portion of the object is pressed, and the action of ultrasonic waves in a pool of solder extending upwardly from said surface in which the object is immersed.

A further purpose of the invention is to improve the tinning of metals of the type above indicated by rubbing a surface of such metal against a tinned surface of substantial area through which ultrasonic waves are transmitted, and which carries a substantial layer of molten solder, by rubbing the metal to be tinned along such surface.

Another object is to provide ultrasonic tinning apparatus in which an ultrasonically vibrated tinned surface is shaped to fit the surface to be tinned and contoured so that the latter surface may be rubbed along the tinning surface, either by rotary, rectilinear or other movement, while maintaining engagement with the tinning surface.

Another purpose is to provide an improved arrangement for tinning without the use of flux by utilizing ultrasonic waves.

The foregoing and other objects and advantages of the invention will appear more fully from consideration of the detailed description which follows, in conjunction with the accompanying drawings wherein one embodiment of the invention is illustrated. It is to be expressly understood, however, that the drawings are for the purposes of illustration and description and are not to be construed as defining the limits of the invention.

Figure 1:
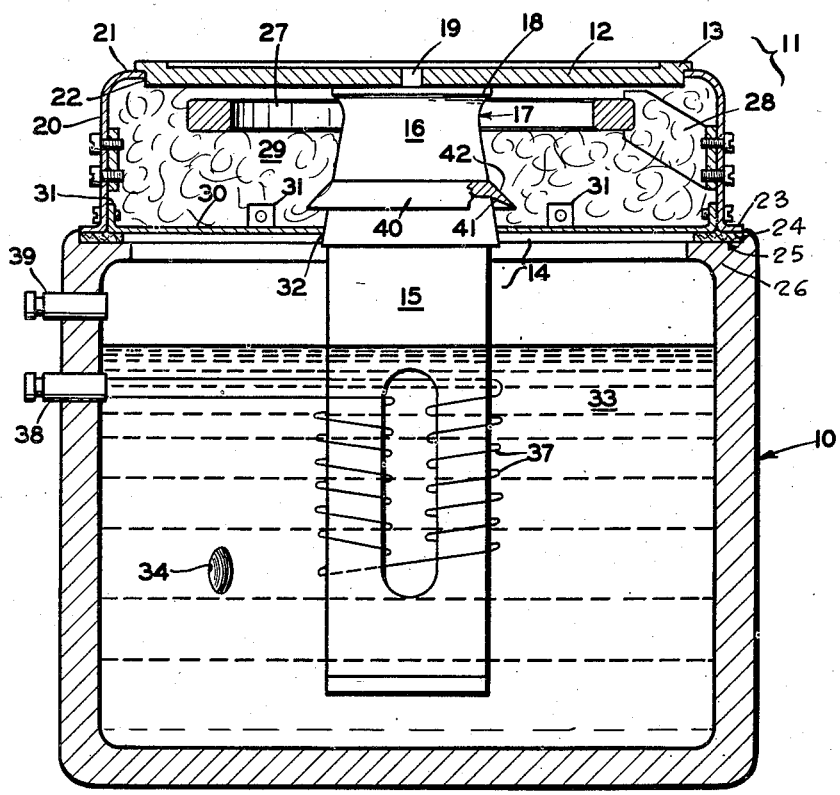
Fig. 1 is a vertical central section through an embodiment of the invention, parts being shown in elevation and broken away.

Said embodiment includes a base 10 in the form of a liquid container having an open top, and a head 11 supported on and extending across the top of said base. The head comprises a flat tinning plate 12 having a low marginal lip 13, arranged to form a shallow container for molten solder. A source of ultrasonic waves supported in engagement with the bottom of plate 12 in position to transmit said waves to the plate is arranged so that the waves are transmitted with effective energy throughout substantially the entire area of said plate.

The wave source is advantageously a magnetostrictive transducer unit 14, comprising a transducer stack 15 firmly connected as by silver brazing to a wave transmission coupling bar 16 fixed to the bottom of plate 12, as by silver brazing. Unit 14 may advantageously be constructed and arranged in the manner set forth in patent application Serial No. 405,756 by the same inventor, filed January 25, 1954. In this form the coupling bar 16 is tapered upwardly from a rectangular end connected to transducer 15, to form a circular neck 17 of reduced diameter, from which it flares outwardly to a thin more flexible lip 18 attached to plate 12, this arrangement serving to concentrate and amplify the wave energy from the transducer 15, to direct the waves efficiently to plate 12, and to counteract the tendency of coupling bar 16 to separate from plate 12 under vigorous wave action. A central stud 19 on coupling bar 16 may be fitted into a central opening in plate 12 to position and assist in retaining coupling bar 16 on plate 12.

Tinning plate 12 is constructed and arranged so that it may be substantially large in diameter, with a flat upper surface adapted to contact a large flat metal surface to be tinned. In order to assure transmission of ultrasonic waves to the peripheral proportions of this plate, it advantageously is substantially thick, a thickness of from 2% to 10% of its diameter having been found effective.

The metal should be one which combines good thermal conductivity with low acoustic impedance, as far as is possible. Copper and stainless steel have been found to be satisfactory, the copper being superior in thermal conductivity while the stainless steel is more effective for transmitting the ultrasonic waves because of its acoustic impedance. The metal selected will of course be determined by the relative heat and ultrasonic wave energy that are available in a particular installation. In one embodiment a copper plate approximately ¼" in thickness and about 8" in diameter has been found satisfactory.

The tinning head 11 includes a suitable support for plate 12, adapted to maintain it in horizontal position. In the form illustrated said head includes a cylindrical casing 20 having an inturned flange 21 at its upper edge, engaging a groove 22 in the lower margin of plate 12, and preferably fixed to said plate as by silver brazing or welding. Casing 20 is advantageously made of metal substantially thinner than plate 12 and adapted to damp the transmission of ultrasonic waves to said casing, which may be accomplished by employing a metal having a substantially different acoustic impedance and low thermal conductivity, such as Monel metal, and by utilizing the lesser thickness of the casing, which moreover may impart a certain amount of wave damping flexibility to flange 21.

Casing 20 is advantageously supported on the base 10 through an element which provides insulation both for ultrasonic waves and for heating. In the form shown, the lower margin of casing 20 is curved outwardly to form a base flange 23 resting on a flat annular gasket 24 made of asbestos or other material having low thermal conductivity, fitting an annular recess 25 in the inturned lip 26 which forms the upper margin of the base container 10.

The tinning head 11 includes a plate heating element positioned adjacent to the lower face of tinning plate 12 in position to maintain said plate at a temperature which will keep the solder thereon in molten condition and at optimum temperature. In the form illustrated, the heating element comprises an annular heating unit 27 concentrically positioned around coupling bar 16 immediately below the lower face of plate 12, and supported from casing 20 by a plurality of brackets 28.

It is important to locate and arrange the heating means such as unit 27 so that the heat transmitted by it to the transducer unit 14 will not be great enough to affect the operation of said unit. It is also desirable to concentrate the heat from said means on the plate 12, and prevent objectionable heating of other parts, by minimizing its transmission to such parts of the apparatus. This is accomplished by proper location and design of the unit 27, and by employing suitable insulation. In the form shown the insulation 29 is of the mineral fiber type such as "Fiberfrax," a trademark of the Carborundum Company of Niagara Falls, New York, and is held in place by a partition 30 marginally attached to casing 20, as by upturned lugs 31 bolted to said casing, the partition 30 extending parallel to plate 12 to a central opening 32 whose margins are slightly spaced from the adjoining portion of the transducer unit 14.

The base container 10 is adapted to hold cooling liquid 33, which covers a substantial part of the transducer stack 15, and extends at least to a level about coil 37. Various ways of cooling such liquid are known, such as cooling coils, radiating fins and liquid circulation sytesms. In the form illustrated the latter arrangement is employed, the container 10 being provided with inlet and outlet openings 34 connected through nipples 35 with circulation hose sections 36.

A suitable arrangement for providing convenient electrical connections to the heating unit 27 and the energizing coil 37 of the transducer stack 15 is provided, the form shown including a plug socket 38 connected to coil 37, and plug socket 39 connected to heating unit 27, said sockets being set into the side wall of container 10.

It has been found that when the transducer unit 14 is in operation, the liquid 33 has a tendency to creep upwardly along the surface of stack 15 and coupling bar 16, and upon reaching the heated zone at the top of said coupling bar, is affected by the heat, forming highly objectionable smoke, and even an explosive gas, when the liquid 33 is an oil of the type commonly used for this purpose. An arrangement is provided to arrest the travel of said liquid before it reaches the heat zone. In the form shown, this comprises an apron 40 extending circumferentially around the surface of coupling bar 16 and having a lower face 41 projecting outwardly from the bar, advantageously inclined downwardly at an angle. Apron 40 is preferably tapered to form a thin marginal lip 42. With this construction the oil traveling upwardly along coupling bar 16 is volatized by the vibrations of apron 40 at a sufficient distance from the heat zone so that it has no tendency to form smoke or gas.

Figure 3:
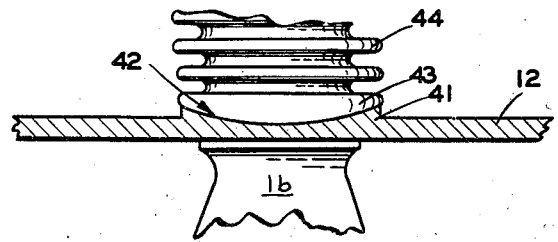
Fig. 3 is a fragmentary section of a modified form of plate 12 shaped to tin bellows units.
Figure 2:
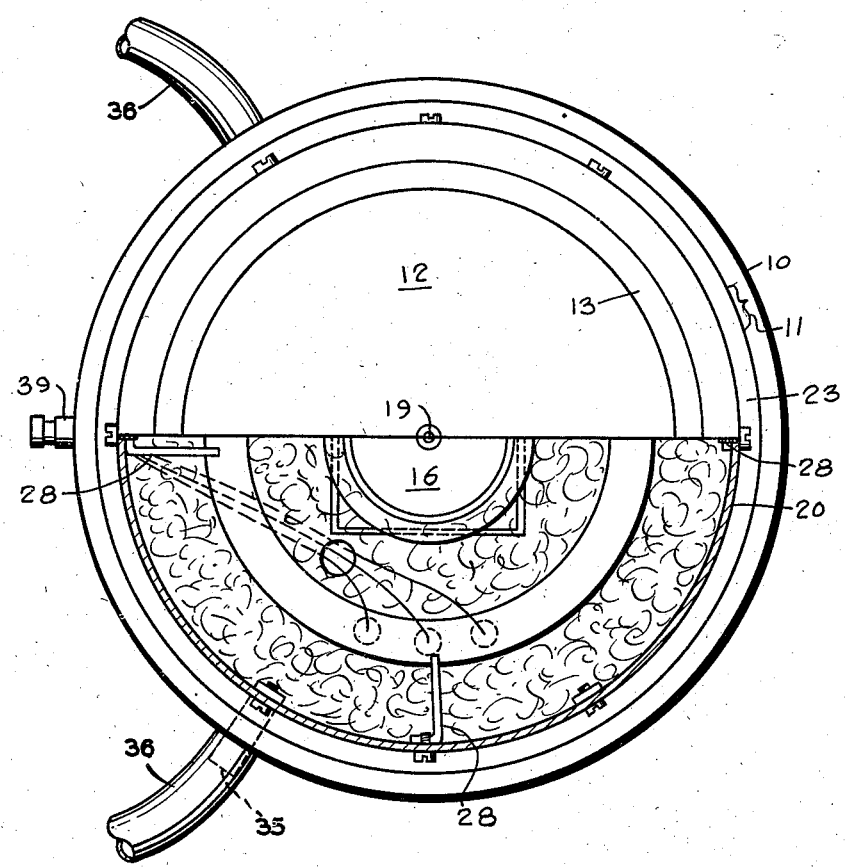
Fig. 2 is a plan view of said embodiment with the lower half of the top thereof broken away.

In the modification illustrated in Fig. 3, the upper surface of plate 12 is contoured to fit a non-planar surface of an article to be tinned, the surface being so shaped that it may be rubbed against the plate, either by rectilinear or by rotary movement. The specific embodiment shown is designed for tinning the lower ends of bellows, said ends being circular with upwardly curved margins. Accurate tinning of such bellows is important, since their operativeness depends on a complete seal, whereas the presence of excess solder or flux interferes with and sometimes prevents correct operation of the bellows. In this embodiment the plate 12 has a central platform 41 with a concave face 42 accurately fitting convex base 43 of a bellows 44. Base 43 is tinned; and it has been found that when the platform 41 is ultrasonically vibrated, the solder will travel upwardly along the base 43 to the margins, maintaining an adequate layer of solder throughout the entire area of said face and assuring adequate marginal soldering of the bellows 44. The tinning effect is of course materially expedited and improved by rotating the bellows 44 with the base 43 in contact with face 42.

In operation, solder is placed on plate 12 and is melted to form a layer retained by lip 13 but extending over the entire face of said plate within the lip. Heating unit 27 maintains the plate throughout at the proper temperature for keeping the solder in molten condition, without heating the transducer unit 14 to a temperature which will approach the Curie point of the transducer and reduce its effectiveness Magnetostrictive transducer stack 15 generates ultrasonic waves, which are carried by coupling bar 16 to the central portion of tinning plate 12, from which they spread along said plate to its peripheral portion, the plate being of adequate thickness to provide for the necessary horizontal transmission without dissipation of the wave energy to an excessive extent in the central zone of said plate.

A metal article to be tinned is placed against plate 12 with its surface immersed in the solder on said plate. The oxide coating of the article on the surface adjacent to plate 12 will be broken up, permitting the solder on the plate to contact the bare metal of the article, wetting it and generally forming an alloy therewith that assures full and permanent adherence to said surface.

This action may be advantageously accelerated and assisted, especially when large flat surfaces are in contact with the plate 12, by moving the object along said plate, either by a straight or a rotary movement, the resulting rubbing serving to assist and expedite the separation and especially the removal of the coating particles from the metal of the object. In this manner large metal areas may be tinned in an extremely short time; and the arrangement is especially efficacious with metals, such as aluminum, magnesium and their alloys, which are difficult to tin, largely because of the fact that the oxide forms almost instantaneously on the surfaces of such metals and prevents the solder from reaching the bare metal and adhering to it.

The ultrasonic transducer unit 14 is operative to perform the indicated functions at substantially all frequencies in the sonic and ultrasonic range, and will be effective at frequencies between about 5 kc. and 60 kc. per second. However, these frequencies are affected by certain practical conditions. Below about 15 kc. the waves produced by the transducer unit are audible to the human ear and are generally objectionable. Consequently frequencies at or above this figure should be used. Likewise, in the higher wave lengths the shortening of the stack 15 makes it progressively more difficult to provide an energizing winding of sufficient size to generate the necessary energy; and with magnetostrictive transducers it has been found that about 50 kc. is the practical upper limit for this reason. However, most effective results have been obtained by using frequencies in the range between about 15 kc. and 28 kc., best results being obtained between 20 kc. and 24 kc.

For convenience reference is made herein to ultrasonic waves; but this expression is intended to include sound waves in both the audible and inaudible ranges, except where otherwise indicated. Reference is also made to vibrations but it is to be understood that this word is intended to designate the condition produced by the transmission of ultrasonic waves, and does not indicate simultaneous physical oscillations of the entire element.

While reference is made herein to flat surfaces, and such surfaces are normally rectilinear in all directions, the term is used to include surfaces which are somewhat curved, but which are free from abrupt changes in direction.

For convenience the metals which are difficult to tin or solder, the best examples of which are aluminum, magnesium and their alloys, are referred to herein simply as refractory metals.

Although but one embodiment of the invention has been illustrated and described in detail, it is to be expressly understood that the invention is not limited thereto. Various changes can be made in the design and arrangement of the invention, as the same will now be understood by those skilled in the art.

I claim:

1. Ultrasonic tinning apparatus, comprising a base and a tinning head mounted on the base, said head comprising a casing, a shallow solder receptacle carried by the casing, an ultrasonic transducer unit engaging the receptacle, a receptacle heating element mounted in the casing, and insulation mounted in the casing around said heating element on the side opposite to the receptacle and between said element and the transducer unit.

2. Ultrasonic tinning apparatus, comprising a base and a tinning head mounted on the base, said head comprising a casing, a shallow solder receptacle mounted on the casing, an ultrasonic transducer unit engaging the receptacle, a heating element spaced from the transducer unit, a partition extending across the casing and spaced from the heating element, and insulation located between the heating element and partition and supported by said partition.

3. Ultrasonic tinning apparatus, comprising a base, a tinning head comprising a casing, a shallow solder receptacle mounted on the casing, an ultrasonic transducer unit engaging the receptacle, and a heating element; and means for removably mounting the head on the base, comprising a vibration-damping insulating element interposed between the base and the head and supporting the head.

4. Ultrasonic apparatus, comprising a container for cooling liquid, a vibratable plate carried by the container, a magnetostrictive transducer unit engaging the plate and extending downwardly into position for immersion in liquid in the container, and a transverse liquid-arresting apron on the unit extending along the surface thereof across the path of liquid traveling upwardly along said surface.

5. Ultrasonic apparatus, comprising a container for cooling liquid, a vibratable plate mounted on the container, a magnetostrictive transducer unit, including a wave transmitting coupling bar engaging the plate and a magnetorestrictive transducer stack attached to the bar and extending downwardly into position for immersion in liquid in the container, and a transverse liquid-arresting apron on the coupling bar extending around said bar along the surface thereof across the path of liquid traveling upwardly along said stack and bar.

6. Ultrasonic apparatus, comprising a container for cooling liquid, a vibratable plate carried by the container, a magnetostrictive transducer unit engaging the plate and extending downwardly into position for immersion in liquid in the container, and a transverse liquid-arresting apron extending around the unit along the surface thereof across the path of liquid traveling upwardly along said surface, said apron having a thin vibratable relatively flexible marginal portion arranged to vaporize liquid traveling along the unit to said marginal portion.

7. Ultrasonic tinning apparatus comprising a metal tinning plate having an upper tinning face, means for ultrasonically energizing said face including an ultrasonic transducer unit engaging the lower face of the plate and subject to damage by temperatures above a predetermined value, means for maintaining a tinning layer of molten solder on said upper face, including a heating element, means for mounting said element below and in heat-transmitting relation to the plate and for inhibiting the transmission of damaging temperatures from the element to the transducer unit, and means for marginally supporting said plate having lower thermal and ultrasonic wave conductivity than said plate.

8. Ultrasonic tinning apparatus comprising a metal tinning plate having an upper tinning face, means for ultrasonically energizing said face including a magnetostrictive transducer unit engaging the lower face of the plate and subject to damage by temperatures above a predetermined value, means for maintaining a tinning layer of molten solder on said upper face, including a heating element, means for mounting said element below and in heat-transmitting relation to the plate and for inhibiting the transmission of damaging temperatures from the element to the transducer unit, and means for marginally supporting said plate having lower thermal and ultrasonic wave conductivity than said plate.

9. Ultrasonic tinning apparatus comprising a metal tinning plate having an upper tinning face, means for ultrasonically energizing said face including an ultrasonic transducer unit engaging the lower face of the plate and subject to damage by temperatures above a predetermined value, means for maintaining a tinning layer of molten solder on said upper face including an annular heating element surrounding the transducer unit, means for marginally supporting said plate having lower thermal and ultrasonic wave conductivity than said plate and means for mounting said heating element on the supporting means in heat-transmitting relation to the plate.

10. Ultrasonic tinning apparatus comprising a metal tinning plate having an upper tinning face, means for ultrasonically energizing said face including an ultrasonic transducer unit engaging the lower face of the plate and subject to damage by temperatures above a predetermined value, means for maintaining a tinning layer of molten solder on said upper face including a heating element, means for supporting said plate including a sheet metal member marginally engaging the plate, substantially thinner than the plate and having lower thermal and ultrasonic wave conductivity than said plate, and means for mounting the heating element on said sheet member in heat-transmitting relation to the plate.

11. Ultrasonic tinning apparatus comprising a metal tinning plate having an upper tinning face, means for ultrasonically energizing said face including an ultrasonic transducer unit engaging the lower face of the plate, a support for the plate including an annular vertical wall of sheet metal substantially thinner than the plate, marginally engaging the plate and having lower thermal and ultrasonic wave conductivity than said plate and annular heating element in heat transmitting relation to the plate, and mounting brackets on said wall engaging the heating element.

12. Ultrasonic tinning apparatus comprising a tinning head including metal tinning plate having an upper tinning face, means for ultrasonically energizing said face, including an ultrasonic transducer unit engaging the lower face of the plate, a casing below the plate including a plate support marginally engaging the plate and having substantially lower thermal and ultrasonic wave conductivity than the plate, a heating element mounted in the head in heat-transmitting relation to the plate, and a head-supporting base.

13. Ultrasonic tinning apparatus comprising a tinning head including a metal tinning plate having an upper tinning face, means for ultrasonically energizing said face including an ultrasonic transducer unit engaging the lower face of the plate, a metal casing having an annular upwardly extending wall engaging the periphery of the plate and having substantially lower thermal and ultrasonic wave conductivity than the plate and a heating element mounted in the head in heat-transmitting relation to the plate.

14. Ultrasonic tinning apparatus comprising a tinning head including a metal tinning plate having an upper tinning face, means for ultrasonically energizing said face including an ultrasonic transducer unit engaging the lower face of the plate, a metal casing having an annular upwardly extending wall engaging the periphery of the plate and having substantially lower thermal and ultrasonic wave conductivity than the plate and an annular heating element mounted on said wall, extending around the transducer unit and in heat-transmitting relation to the plate.

15. Ultrasonic tinning apparatus comprising a tinning head including a metal tinning plate having an upper tinning face, means for ultrasonically energizing said face including an ultrasonic transducer unit engaging and extending downwardly from the lower face of the plate, a casing including a plate support marginally engaging the plate and extending downwardly from the plate, said casing having substantially lower thermal and ultrasonic wave conductivity than the plate, a heating element mounted in the head in heat-transmitting relation to the plate, a head-supporting base engaging the casing, said transducer unit extending downwardly into the base, and a partition mounted on the head and extending transversely around the transducer unit, separating the head from the base.

16. Ultrasonic tinning apparatus comprising a tinning head including a metal tinning plate having an upper tinning face, means for ultrasonically energizing said face including an ultrasonic transducer unit engaging and extending downwardly from the lower face of the plate, a casing including a plate support marginally engaging the plate and extending downwardly from the plate, said casing having substantially lower thermal and ultrasonic wave conductivity than the plate, a heating element mounted in the head in heat-transmitting relation to the plate, a head-supporting base engaging the casing, said transducer unit extending downwardly into the base, a partition mounted on the head and extending transversely around the transducer unit, separating the head from the base and bulk insulating material in the head between the partition and the plate.

17. Ultrasonic tinning apparatus comprising a tinning head including a metal tinning plate having an upper tinning face, means for ultrasonically energizing said face including a magnetostrictive transducer unit engaging the lower face of the plate, a heating element mounted in the head in heat-transmitting relation to the plate, a support marginally engaging the plate and having substantially lower thermal and wave conductivity than the plate, and a base engaging the support and including a cooling chamber surrounding the lower part of the transducer unit below said support.

18. Ultrasonic tinning apparatus comprising a tinning head including a metal tinning plate having an upper tinning face, means for ultrasonically energizing said face including a magnetostrictive transducer unit engaging the lower face of the plate, a heating element mounted in the head in heat-transmitting relation to the plate, a support marginally engaging the plate and having substantially lower thermal and wave conductivity than the plate, a base engaging the support and including a cooling chamber surrounding the lower part of the transducer unit below said support, and a partition mounted on the head and extending transversely around the transducer unit between the cooling chamber and the heating element.

19. Ultrasonic tinning apparatus comprising means for tinning the non-planar lower surface of an article, including a metal tinning plate having an upper tinning surface, means for ultrasonically energizing said plate, and heating means for maintaining said plate at solder-melting temperature, said face including a vertically extending area fitting said non-planar surface, said area constituting means for distributing molten solder by the action of ultrasonic waves over vertically extending portions of such article surface when pressed against said area.

20. Ultrasonic tinning apparatus comprising means for tinning the lower convex axially symmetrical surface of an article including a metal tinning plate having an upper tinning surface, means for ultrasonically energizing said plate and heating means for maintaining said plate at solder melting temperature, said surface including a vertical extending axially symmetrical concave area fitting said convex surface, said area constituting means for distributing molten solder by the action of ultrasonic waves of vertically extending portions of such convex surface when pressed against said area.

References Cited in the file of this patent
UNITED STATES PATENTS 2,397,400   Barwich _____ Mar. 26, 1946